UNITED STATES PATENT OFFICE.

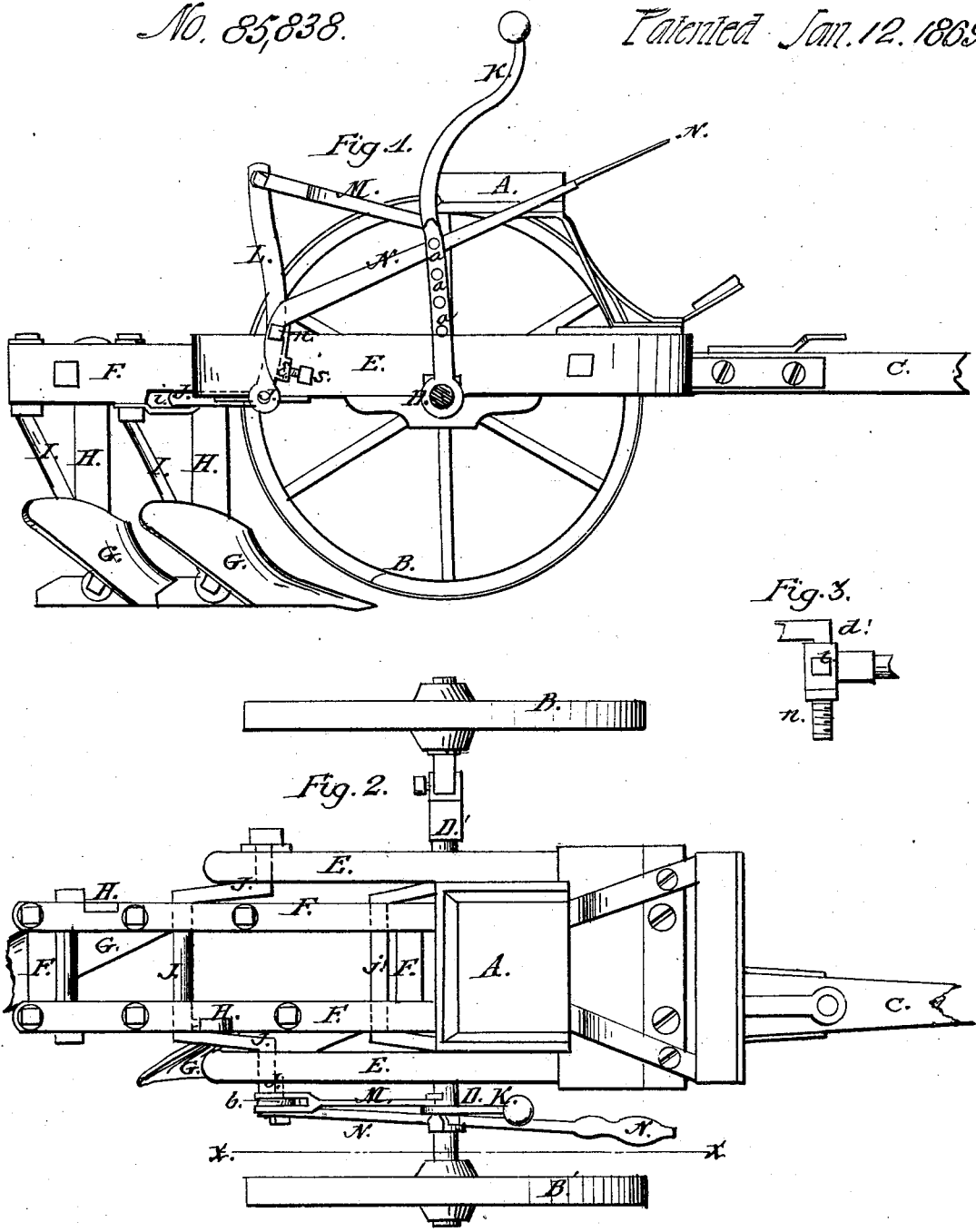

WILLIAM MASON, OF INDEPENDENCE, OREGON.

IMPROVEMENT IN GANG-PLOWS.

Specification forming part of Letters Patent No. 85,838, dated January 12, 1869.

*To all whom it may concern:*

Be it known that I, WM. MASON, of Independence, in the county of Polk and State of Oregon, have invented a new and Improved Gang-Plow; and I do hereby declare that the following is a full, clear, and exact description of the construction and operation of the same, reference being had to the accompanying drawings, making a part of this specification, in which—

Figure 1 is a section through line $xx$. Fig. 2 is a top view. Fig. 3 is a detached view of the device for equalizing the height of the wheels.

The object of this invention is to construct a simple and strong gang-plow which can be more easily and conveniently operated than those now in use.

To this end the invention consists in a new method of raising and lowering the plows and a new method of constructing the axle-tree, to avoid the necessity for making the near wheel smaller than the other.

In the drawings, A is the seat; B B', the wheels; C, the draft-pole; D, the axle; E, the main frame of the machine, supported upon the axle D; F, the frame which supports the plows; G G, the plows; H H, the plow-standards; I I, braces to strengthen the plows; J, a crank-shaft for raising the rear end of the frame F; J', a double crank in the axle for raising the forward end of said frame; K, a hand-lever for rocking the axle; L, a lever for rocking the crank-shaft J; M, a connecting-rod extending from lever K to lever L; and N, a foot-lever or treadle for rocking the two cranks.

The plow-frame F, resting as it does upon the two double cranks, which pass through oblong bearings or slots $i\ i$ on its under side, is raised and lowered, so as to insert the plows into the ground or remove them therefrom, by simply rocking the two crank-shafts on their axes. The two shafts are always rocked in the same direction and to the same extent, by moving either lever K or L, both being so connected by the rod M that one cannot be moved without moving the other, whereby the plow-frame, whatever may be its elevation from the ground, is always kept in a perfectly horizontal position. The lever N is pivoted at $n$ to the lever L; thence it bends downward to the point $e$, where it is provided with a strong flange, which extends across the front edge of lever L, and has an adjusting-screw, $s$, working through the flange against the lever. The object of this arrangement is to enable the lever N to be adjusted to a convenient position to be operated by the driver's foot. The lever extends through a guide or slot in or attached to the side of the lever K, and provided with a pin and a series of holes, $a\ a$, by which the lever N can be prevented from rising beyond any hole in the series, and the plows be prevented from sinking too deep in the ground.

In consequence of the fact that one wheel, B', has to run in the furrows while the other runs on the unplowed ground, four, six, or eight inches higher, the wheels have heretofore been made of different sizes, so as to keep the machine in a horizontal position. I avoid the inconvenience and expense of this by making my wheels of uniform size and dimensions, and constructing the axle in two parts, D D', one part, D', which bears the near wheel, being bent down at right angles at its inner extremity, as shown at $d'$, and having the bent part extending through a socket on the end of the part D. In this position the two parts of the axle are firmly secured together by a screw and nut, $r$, and a set-screw, $t$. The bent part $d$ extends through the socket at an inclination of ninety degrees to the plane of the crank J', so that when the crank is in a horizontal position the part $d'$ is in a vertical position, and when in a vertical position the crank is in a horizontal position. By so much, therefore, as the frame F is depressed the wheel B is elevated, and vice versa. When going to or returning from the field, the frame will be raised, bringing the part $d$ to a horizontal position, and the parts D and D' to the same height from the ground. When we arrive at the field and set the plows in the ground, we thereby elevate the near wheel from six or eight inches (more or less) above the other, preserving the horizontality of the whole machine. No additional or complicated machinery is necessary to effect this. The movement of the lever that raises or lowers the plow-frame sets the wheels in their proper position relatively to each other.

The whole device is very simple and durable. It can be got up at little expense, and is exceedingly effective and convenient of operation.

Having thus described my invention, what I claim as new, and desire to secure by Letters Patent, is—

1. In the gang-plow, the bent axle herein described, consisting of the parts D D', the part D' being bent at right angles, and having one of its arms fitted in a socket on the end of the part D, the former being made adjustable relatively with the latter by means of nut $n$ and set-screw $t$, as and for the purpose specified.

2. In combination with the frames E F, crank-axle D D', crank-shafts J J', and plows G G, the levers I K, connecting-rod M, and treadle N, as and for the purpose specified.

3. The arrangement and combination of the levers K L N, rod M, stops $a\ a\ a$, and crank-shafts D D' J, when said parts are constructed to operate in the manner specified.

4. The lever N, when provided with the flange $e$ and adjusting-screw $s$, substantially as specified.

Witness my hand and seal June 30, 1868.

WILLIAM MASON. [L. S.]

Witnesses:
W. C. WHITSON,
A. F. WHEELER.